May 30, 1933.  F. N. BARD  1,911,344
LUBRICATED PLUG VALVE
Filed Dec. 31, 1927
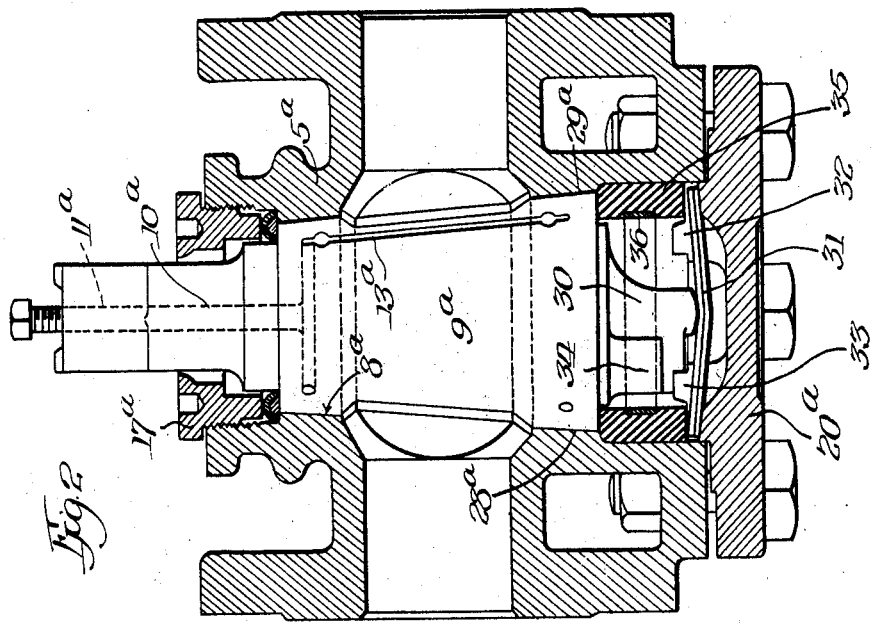
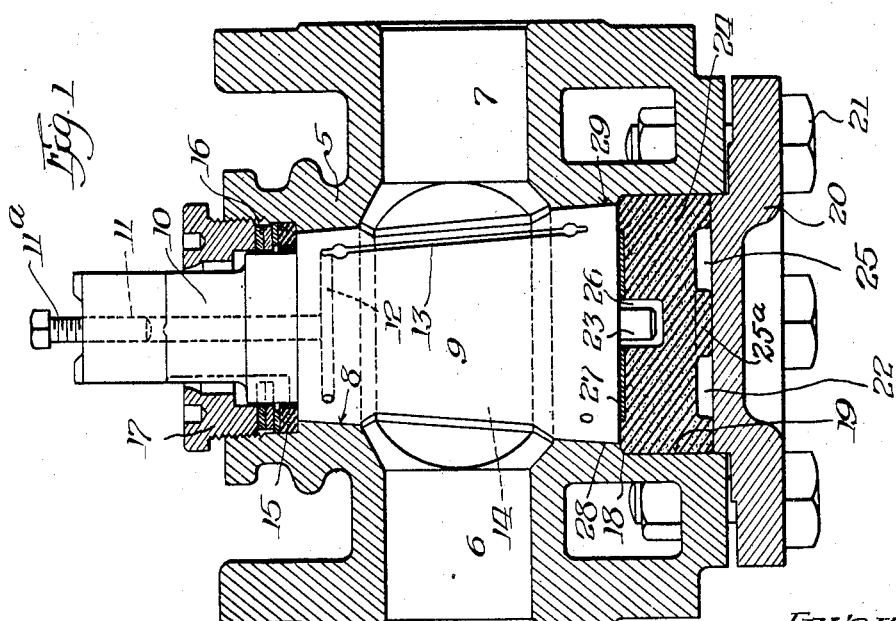

Patented May 30, 1933

1,911,344

UNITED STATES PATENT OFFICE

FRANCIS NORWOOD BARD, OF HIGHLAND PARK, ILLINOIS, ASSIGNOR TO WALWORTH PATENTS INC., OF BOSTON, MASSACHUSETTS, A CORPORATION OF MASSACHUSETTS

LUBRICATED PLUG VALVE

Application filed December 31, 1927. Serial No. 243,995.

This invention relates in general to valves, and, more particularly, to valves of the rotatable plug type, the invention being illustrated and described as incorporated in a lubricated plug valve through it will be understood that the invention finds a wide field of utility for other analogous purposes.

In the employment of lubricated plug valves, and the like, in conduits containing caustic or acid solutions and wherein, as is not unusual, the plug valve is formed with a tapered valve member and a tapered seat against which said member is engaged under the action of a spring, leakage often occurs either in normal operation or when the plug is lifted from its seat for lubricating purposes permitting the contents of the conduit and the valve to enter the spring chamber and either become solidified therein and hamper the operation of the spring or act chemically on the spring or otherwise to deteriorate the same prematurely. It is, therefore, one of the principal objects of my invention to provide an improved means for employment in plug valves, and the like, for either serving to keep the valve on its seat and to seal off the chamber from the contents of the pipe line, or to provide an auxiliary seal in conjunction with such valves as employ springs in these chambers, a further object of the invention being to provide such an improvement as may be readily installed in plug valves now in use without material alteration in their structures.

A further object of the invention is to provide a yielding sealing member for employment in plug valves, and the like, for excluding the contents of the pipe line from the spring member, if employed, or for acting as a resilient means for holding the valve on its seat and formed of a material which is not readily affected by the fluids passing through the valve and which may come in contact with the device of this invention.

The foregoing and such other objects and advantages as may appear or be pointed out as this description proceeds are attained in the structural embodiments of the invention illustrated in the accompanying drawing in which:

Figure 1 is a vertical sectional view embodying the improvements of this invention, and Figure 2 is a vertical sectional view of an alternative form of this invention.

Referring now more particularly to the drawing, and first in particular to Figure 1, I have illustrated a valve casing 5 having an inlet 6 and an outlet 7 for connection to the parts of the conduit in general. The casing 5 is provided with a tapered valve seat 8 on which a convenient form of lubricated plug valve member 9 engages, said plug valve member 9 having a stem portion 10 which projects from the upper end of the casing 5, as viewed in Figure 1, and is suitably formed to receive a turning instrument.

The plug valve member, being of the lubricated type, is shown as provided with a lubricant chamber 11 communicating by passageways 12 with grooves 13 which are either in the plug valve member 6 or may be placed in the seating surface between the plug valve and its seat. The plug member is provided with the conventional transverse passageway 14 for conducting fluids from the inlet 6 to the outlet 7.

In order to prevent leakage at the upper end of the valve and also to permit of a slight upward movement of the valve and therefore, as will hereinafter appear, a balancing of the valve member, I provide a yielding packing 15 held in place by metallic rings 16 and a threaded gland 17.

In this type of valve the smaller end of the valve, due to its taper being at the upper end as viewed in Figure 1, it is obvious that the valve member must be introduced from the bottom, and, therefore, the valve seat 8 extends downwardly to the point indicated at 18, and an opening 19 is afforded, closed by a closure plate 20 secured in position by bolts 21.

The distance between the bottom of the plug valve member 9 and the top of the plate 20 affords a chamber 22 which, in some conventional forms of valves, contains a resilient member for yieldingly keeping the valve on its seat and as I have shown my invention as applied to such a valve, it will be seen that the bottom of the plug valve member 9 is provided with a projection 23 which may engage such a spring.

In the present form of the invention I deposit in the chamber 22, substantially entirely filling the same, a packing member 24 preferably formed of a yielding material, such as high-grade rubber or the like, which has sufficient resiliency to permit of the valve being raised the required distance off its seat in response to pressure established in the lubricant chamber 11 by means of a cap screw 11a and yet of sufficient expansive qualities as to facilitate return of the valve to its seat. This packing member 24 substantially entirely fills the chamber 22, a slight air space 25 being afforded beneath the packing 24 to facilitate its flexing and, in the particular installation shown, the packing member is provided with a recess 26 to accommodate the projection 23, though it will be obvious that this is not essential where the packing is applied to a new valve constructed to receive it. The upper surface of the packing 24 is provided with a metallic plate 27 which protects the same against undue friction and tends to assist in distributing the pressure thereon to the end that an even distortion of the member 24 will take place when required. It will be observed that the points 28 and 29 are effectively sealed by the member 24 so that leakage cannot take place past these points, and such leakage of fluids in the pipe line as may reach these points is of little effect in causing the distortion of the packing itself.

It will be observed that the annular recess 25 not only leaves the peripheral edge of the packing member 24 in position to be held compressed to form the seal and to tend to hold the valve on its seat but, in addition, leaves the axially contacting portion 25a which insures that adequate pressure is established at the portion of the packing 24 to hold the friction-relieving plate in snug engagement with the adjacent surface of the valve. Without the projecting portion 25a in the nature of a button, there would be a tendency for the packing member to sag in the central portion and draw the peripheral edge of the packing member away from the wall of the chamber, particularly adjacent to the point where it is most desirable that a seal be provided. For this reason, the button 25a has been provided.

Referring now to Figure 2, I provide a valve casing 5a, a valve seat 8a, a plug valve member 9a, the latter having a stem 10a and being constructed substantially in accordance with the form of the invention shown in Figure 1, with the exception that a different style of packing is shown. This packing is more particularly described and claimed in my application, Serial No. 130,365, and it will be sufficient to state here that this packing is somewhat yielding in nature so as to cause the valve to be balanced between it and a spring member hereinafter described. A gland 17a retains the packing in position and prevents leakage.

The plug valve member 9a is provided with lubricant grooves 13a and a lubricant chamber 11a similarly to the plug valve member shown in Figure 1.

In the form of the invention shown in Figure 2 the bottom of the valve member is constructed differently from the structure shown in Figure 1, that is, the bottom of the plug valve member is provided with a projection 30 which engages a flat spring member 31, the latter being held against rotation on the closure plate 20a by the provision of complemental abutments 32 and 33. The tendency of the spring 31 is to force the valve upwardly by contact with the projection 30 though the valve is susceptible of downward movement, as viewed in Figure 2, under the action of lubricant forced between the valve and its seating surface.

The projection 30 here is provided with a lateral enlargement 34 which is adapted to engage one or the other of the abutments 32 and 33 which serve as limit stops, that is, "closure stops" for the valve.

In order to seal the space containing the spring 31 and the projection 30 against ingress of fluids from the conduit or the valve, due to leakage at the points 28a and 29a, I provide an annular sealing member 35 which is formed of a resilient material similarly to the packing member 24, this annular sealing member 35 having an internal annular armor 36 which reinforces the member 35 and prevents its undue distortion under pressure. The member 35 extends completely around the bottom of the plug valve member and thus forms an effective seal at the points 28a and 29a and is formed of a material which is not readily susceptible to distortion under the effect of caustic and acid solutions.

It will be observed that in both of the forms of the invention shown, there is a balancing of the valve between the packing at the top of the same and the sealing means at the bottom, and in one instance, that is, Figure 1, the packing at the bottom serves to keep the valve upon its seat, whereas, in the other instance in Figure 2, the packing serves as an auxiliary means for keeping the valve on its seat but serves more particularly as a packing at this point. It will further be understood that the form of the invention shown in Figure 2 is for employment in a plug valve wherein the valve is held on its seat by the provision of a flat spring, and the sealing means 35 serves as a seal as well as an auxiliary means for tending to return the valve to its seat. It will be understood, of course, that the member 35, or a slight modification thereof, may be employed in the device of Figure 1 without modifying the spring member usually employed in an arrangement such as that shown in this figure.

It will be observed that the stop member carried by the projection on the bottom of the valve engages the abutments 32 and 33 which hold the flat spring member 31 in position and that this arrangement is not in any way interfered with by the provision of the annulear sealing means 35. Furthermore, the same abutments which form stops for the quarter turning of the valve also serve to prevent rotation of the spring member on the closure plate.

Having thus described my invention and illustrated its use, what I claim as new and desire to secure by Letters Patent is:

1. In a device of the character described, in combination, a casing having a tapered valve seat open at both ends, a tapered valve member engaging said seat, an operating stem for the valve member projecting from one end thereof and beyond one end of said valve seat, a packing for said valve member adjacent to said valve stem, a chamber formed as an extension of said valve seat at the other end of said valve member, a closure for said chamber, a continuous non-metallic resilient and compressible sealing member in said chamber abutting the closure and the adjacent end of said valve member, a metallic disc element in said compressible member but having its greatest dimension less than the diameter of said compressible member so as to restrict contact of said compressible member with only a portion of the adjacent end surface of said valve member and casing, said metallic element directly engaging the major portion of the adjacent end surface of the valve member, said non-metallic element being in abutment with said closure so that, when the latter is moved tightly into closed position, the peripheral portion of said non-metallic element is compressed into intimate engagement with the adjacent surface of said valve member to form a seal adjacent to the joint between the valve member and the casing.

2. In a device of the character described, in combination, a casing having a tapered valve seat open a both ends, a tapered valve member engaging said seat, an operating stem for said valve member projecting from one end thereof and beyond one end of said valve seat, a packing for said valve member, a chamber formed as an extension of said valve seat at the opposite end thereof, a closure for said chamber, a resilient and compressible member substantially filling said chamber and abutting the closure and the adjacent end surface of said valve member, said compressible member being of a character to distribute pressure on said valve surface tending to hold the valve on its seat, a disc-like friction-reducing element embedded in said resilient and compressible element and in contact with said valve surface but leaving a narrow annular exposed portion of said resilient element for engagement with the casing and valve adjacent to the joint therebetween, said resilient element having an annular recess in the surface thereof opposite to said friction-reducing element and adjacent to said closure, said recess being of nearly the same dimensions as said friction-reducing element and in axial alignment therewith for providing an annular sealing portion of said resilient element in engagement with the closure, means for drawing said closure against said resilient element so that the annular exposed and sealing portions of said non-metallic element are placed under compression between the surfaces of the valves and closure to tend to hold the valve on its seat and thereby form such fluid-tight seal, said friction-relieving element confining the contact of said resilient element with said valve to a relatively small area.

3. In a device of the character described, in combination, a casing having a tapered valve seat open at both ends, a tapered valve member engaging said seat, an operating stem for said valve member projecting from one end thereof and beyond one end of said valve seat, a resilient packing for said valve member adjacent to said stem, a gland for compressing said resilient packing, which latter acts to tend to move the valve in one direction in its seat, a chamber formed as an extension of said valve seat at the other end thereof, a closure for said chamber, a substantially continuous resilient and compressible member in said chamber abutting the closure and the adjacent end surface of said valve member and a part of said casing so that, when placed under compression, a seal will be formed adjacent to the joint between the valve and its seat, a disc-like friction-reducing element interposed between said resilient and compressible member and the adjacent end surface of the valve member and of a diameter less than the diameter of said compressible and resilient member for confining the area of contact of the latter with said valve member to a predetermined dimension, and means for actuating said closure to bring a portion thereof into compressed relationship with the adjacent surface of said resilient and compressible member to compress the same between the closure and the adjacent end surfaces of the valve member to tend to maintain the same on its seat against the tension of said resilient packing and to form a fluid-tight seal at the joint between said casing and said valve member.

4. In a device of the character described, in combination, a casing having a tapered valve seat open at both ends, a tapered valve member engaging said seat, an operating stem for the valve member projecting from one end thereof and beyond one end of said valve seat, a packing for said valve member adjacent to said valve stem, a chamber formed as an extension of said valve seat at the other end of said valve member, a closure for said chamber, a continuous non-metallic resilient and compressible sealing member in said chamber abutting the closure and the adjacent end of said valve member, a metallic disc element in said compressible member but having its greatest dimension less than the diameter of said compressible member so as to restrict contact of said compressible member with only a portion of the adjacent end surface of said valve member and casing, said metallic element directly engaging the major portion of the adjacent end surface of the valve member, said non-metallic element being in abutment with said closure so that, when the latter is moved tightly into closed position, the peripheral portion of said non-metallic element is compressed into intimate engagement with the adjacent surface of said valve member to form a seal adjacent to the joint between the valve member and the casing, and an annular recess in said compressible member forming a substantially centrally disposed contact portion of the compressible member acting along the axis of the valve member to tend to hold said friction-relieving element in snug contact with the adjacent end surface of the valve member when compressed by said closure.

In testimony whereof, I have hereunto signed my name.

FRANCIS NORWOOD BARD.